United States Patent
Gill

(10) Patent No.: US 8,424,330 B2
(45) Date of Patent: Apr. 23, 2013

(54) PORTABLE AUXILIARY REFRIGERATION UNIT FOR TEMPORARY, EMERGENCY REFRIGERATION OF REFRIGERATED TRUCKS/TRAILERS

(76) Inventor: David A. Gill, Douglasville, GA (US)

(*) Notice: Subject to any disclaimer, the term of this patent is extended or adjusted under 35 U.S.C. 154(b) by 310 days.

(21) Appl. No.: 11/739,059

(22) Filed: Apr. 23, 2007

(65) Prior Publication Data

US 2007/0245756 A1  Oct. 25, 2007

Related U.S. Application Data

(60) Provisional application No. 60/794,264, filed on Apr. 21, 2006.

(51) Int. Cl.
   *F25D 15/00*  (2006.01)
   *B60H 1/32*  (2006.01)

(52) U.S. Cl.
   USPC ............................................ 62/237; 62/239

(58) Field of Classification Search ............ 62/239, 62/237, 115
   See application file for complete search history.

(56) References Cited

U.S. PATENT DOCUMENTS

| | | | |
|---|---|---|---|
| 2,026,855 A | 1/1936 | Whyte | |
| 2,197,437 A | 4/1940 | Reilly | |
| 2,240,377 A | 4/1941 | Preble | |
| 2,287,705 A | 6/1942 | Perkins et al. | |
| 2,293,316 A | 8/1942 | Stebbins | |
| 2,303,867 A | 12/1942 | Stebbins | |
| 2,538,382 A * | 1/1951 | Reilly | 62/237 |
| 2,706,102 A * | 4/1955 | Cresci | 254/8 C |
| 2,778,206 A | 1/1957 | Wilson et al. | |
| 3,777,506 A | 12/1973 | Hergatt et al. | |
| 4,632,019 A * | 12/1986 | Whiteman | 454/76 |
| 4,934,255 A * | 6/1990 | McDonnell et al. | 454/174 |
| 4,943,204 A * | 7/1990 | Ehrlich | 414/495 |
| 5,031,690 A * | 7/1991 | Anderson et al. | 165/43 |
| 5,487,278 A * | 1/1996 | Hilleveld et al. | 62/236 |
| 5,564,287 A | 10/1996 | Hearne, Jr. et al. | |
| 6,746,323 B1 * | 6/2004 | Digby, Jr. | 454/91 |
| 2003/0140564 A1 * | 7/2003 | Delgado et al. | 49/360 |
| 2004/0216469 A1 * | 11/2004 | Viegas et al. | 62/50.2 |

* cited by examiner

*Primary Examiner* — Frantz Jules
*Assistant Examiner* — Cassey D Bauer
(74) *Attorney, Agent, or Firm* — Smith Risley; Steven P. Wigmore

(57) ABSTRACT

A method and apparatus for temporarily refrigerating perishable items contained in a refrigerated truck or trailer whose refrigeration unit is not functioning properly or at all. The apparatus comprises a portable, auxiliary refrigeration unit adapted to be transported to the refrigerated truck or trailer and includes a sealing element configured and adapted for placement in or adjacent a door opening of the refrigerated truck or trailer to provide at least a partial seal thereat. A chilled air duct is provided for delivering chilled air through/across the sealing element to the perishable items inside the refrigerated truck or trailer and the portable, auxiliary refrigeration unit is operable to deliver chilled air through the chilled air duct and into the interior of the refrigerated truck or trailer.

3 Claims, 5 Drawing Sheets

PORTABLE AUXILIARY REFRIGERATION UNIT FOR TEMPORARY, EMERGENCY REFRIGERATION OF REFRIGERATED TRUCKS/TRAILERS

CROSS-REFERENCE TO RELATED APPLICATIONS

The benefit of the filing date of U.S. provisional patent application Ser. No. 60/794,264, filed Apr. 21, 2006, entitled PORTABLE AUXILIARY REFRIGERATION UNIT FOR TEMPORARY, EMERGENCY REFRIGERATION OF REFRIGERATED TRUCKS/TRAILERS, is hereby claimed, and the specification thereof is incorporated herein by this reference.

TECHNICAL FIELD

The present invention relates generally portable refrigeration units and more particularly to a portable refrigeration unit for temporarily refrigerating perishable items contained in a refrigerated truck or trailer whose own refrigeration unit is not functioning.

BACKGROUND

Refrigerated trucks and trailers are often used to transport perishable goods such as milk or other dairy products, seafood, meats, blood plasma and other biologicals, pharmaceuticals, fresh flowers, etc. These trucks and/or trailers typically have a self-contained refrigeration unit for refrigerating the perishable items. These refrigeration units sometimes break down, which can allow the temperature of the perishable items to rise quickly. In such instances, the perishable goods aboard the truck or trailer are often spoiled, destroyed or compromised. In other instances, the operator of the truck or trailer is able to obtain dry ice (frozen carbon dioxide) in an effort to preserve the perishable goods. However, dry ice is not always available or a good practical solution, and is only a very temporary solution. Also, dry ice can be expensive in the quantities needed to preserve larger quantities of goods, especially in instances in which the refrigeration unit of the truck or trailer is broken down for an extended period of time. Also, the use of dry ice as a temporary measure is limited by the fact that the dry ice typically is placed near the door opening, while much of the perishable cargo is far from the door opening. In the absence of a forced air circulation or movement, the cooling effect from the dry ice is more pronounced near the dry ice and is less far from the dry ice.

Thus, it can be seen that needs yet exist for improvements to methods and devices of providing auxiliary cooling in emergency situations for refrigerated trucks and/or trailers. It is to the provision of these needs and others that the present invention primarily is directed.

SUMMARY OF THE INVENTION

Briefly described, in a first preferred form the present invention is a method of temporarily chilling perishable items being transported by refrigerated truck or trailer, the truck or trailer having a refrigeration unit that is not functioning at the moment. By temporarily chilling the refrigerated truck or trailer, the perishable items can be maintained without further spoilage or damage.

Preferably, the method includes the step of transporting a portable, auxiliary refrigeration unit to the refrigerated truck or trailer, wherein the portable, auxiliary refrigeration unit has a sealing element and a chilled air duct for delivering chilled air to the interior of the truck or trailer. After delivering the portable, auxiliary refrigeration unit to the refrigerated truck or trailer, one or more doors of the refrigerated truck or trailer is (are) opened to provide access through the door opening to the perishable items inside the refrigerated truck or trailer. The sealing element is placed in or adjacent the door opening of the refrigerated truck or trailer to provide at least a partial seal thereat. Thereafter, the portable, auxiliary refrigeration unit is operated to deliver chilled air through the chilled air duct and into the interior of the refrigerated truck or trailer.

In another preferred form the present invention comprises an apparatus for temporarily refrigerating perishable items contained in a refrigerated truck or trailer whose refrigeration unit is not functioning properly or at all. Preferably the apparatus comprises a portable, auxiliary refrigeration unit adapted to be transported to the refrigerated truck or trailer, including a sealing element configured and adapted for placement in or adjacent a door opening of the refrigerated truck or trailer to provide at least a partial seal thereat. The portable, auxiliary refrigeration unit further includes a chilled air duct for delivering chilled air through/across the sealing element to the perishable items inside the refrigerated truck or trailer. With this construction, the portable, auxiliary refrigeration unit is operable to deliver chilled air through the chilled air duct and into the interior of the refrigerated truck or trailer.

Advantageously, the present invention allows perishable items, which often can be quite valuable or important, to be maintained in a good condition, even as the truck or trailer in which they are being transported fails on its own to maintain proper climate controlled conditions. The invention allows a service vehicle, whether it be in the form of a pull-behind trailer or a specially adapted truck or other vehicle, to be transported quickly to the site of a perishable load and placed in operation in short order. This rapid response can save many perishable loads. Moreover, the portable, auxiliary refrigeration unit does a superior job as compared to the conventional use of dry ice, inasmuch as it circulates refrigerated air into and throughout the interior of the truck or trailer containing the perishable items. This helps to ensure that the entire load of perishables is saved, not just the items nearest the door (where one typically would place the dry ice). Advantageously, the present invention is equally applicable to keeping items warm in winter, despite a non-working climate control unit on the truck or trailer and cold ambient conditions.

BRIEF DESCRIPTION OF THE DRAWINGS FIGURES

DETAILED DESCRIPTION OF EXAMPLED EMBODIMENTS

Figure 1:
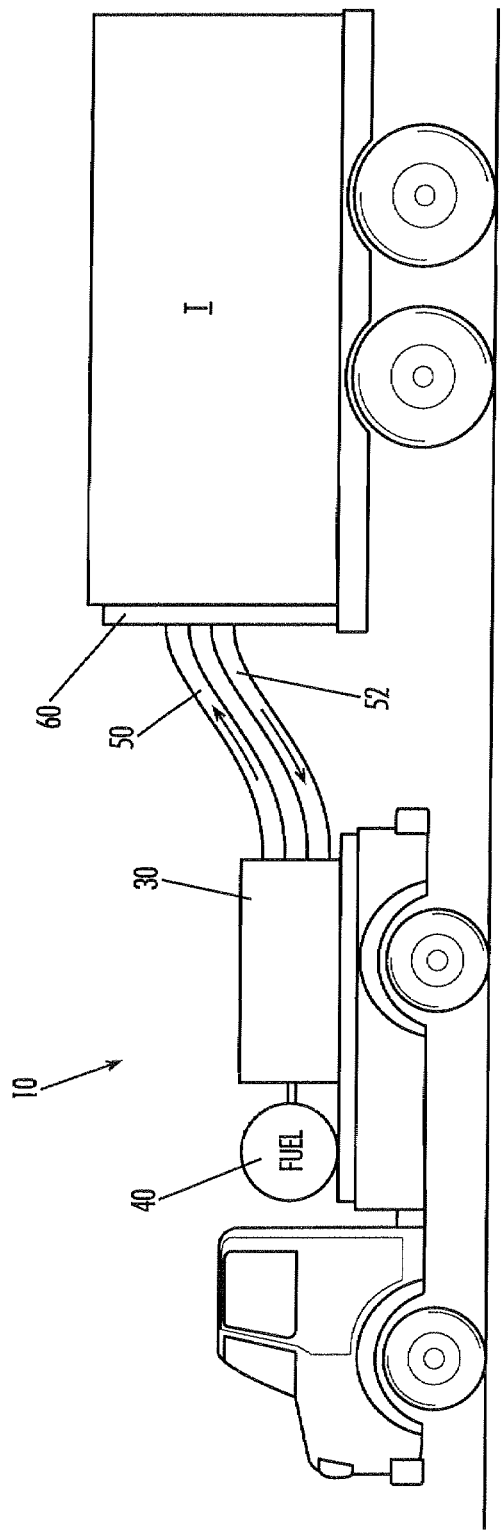
FIG. 1 is a side view of a portable auxiliary refrigeration unit according to an example embodiment of the present invention.
Figure 2:
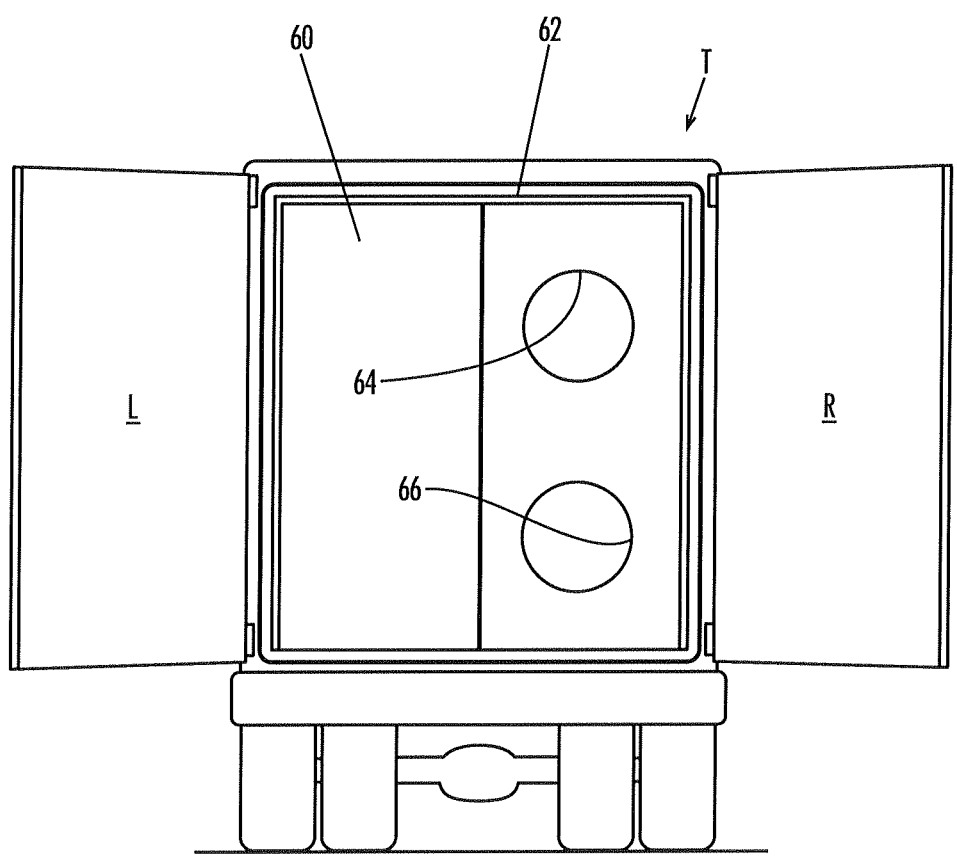
FIG. 2 is a rear view of a truck needing auxiliary refrigeration and shown fitted with a sealing element of the portable auxiliary refrigeration unit of FIG. 1.

With reference now to the drawing figures, FIGS. 1-2 show a portable auxiliary refrigeration unit 10 according to an example embodiment of the present invention. The portable refrigeration unit 10 of the present invention is directed primarily towards the temporary refrigeration of refrigerated trucks and/or trailers T. It will be understood that the same equipment can be used to maintain cargo as warm against frigid ambient conditions. In this regard, the term "refrigeration unit" or "cooling unit" will be understood to refer to a unit that can cool as well as heat.

In example embodiments, the portable refrigeration unit 10 is generally comprised of a self-contained cooling unit 30, a fuel tank 40, at least one supply air hose 50, at least one return air hose 52, and a sealing element 60. The cooling unit 30 and fuel tank 40 can be mounted on any number of locations including: the bed of a flatbed truck, in the bed of a pickup truck, inside a cargo van or delivery truck, on a portable trailer, or other suitable location. In other embodiments, the fuel tank 40 can be integrated within the self-contained cooling unit 30.

The at least one air supply 50 and one return 52 air hose can be selectively coupled to the cooling unit 30 for recycling and cooling air from the truck/trailer or other space needing temporary refrigeration. By recycling the air to be cooled, typically the cooling unit 30 is able to use less energy to maintain a desired temperature than if the unit only conditioned outside air for delivery into the space requiring cooling. The air supply/return hoses, 50, 52 respectfully, can be any type of hose or pipe suitable for the transport of air and preferably are flexible enabling the refrigeration unit 10 to cool spaces at different elevations relative to the refrigeration unit itself. For example, a refrigeration unit 10 mounted in a pickup truck would be significantly lower than the cargo bay of refrigerated truck T. As such, flexible hoses would allow for the refrigeration unit to pump cool air into such a cargo area. In other embodiments, the supply hose 50 and return hose 52 can both be contained within one larger hose for ease of installation within the area to be refrigerated. In still other alternative embodiments, the portable refrigeration unit 10 includes only a supply hose 50 and does not recycle the air from the truck/trailer.

The sealing element 60 can be used to fit into the opening of the space to be refrigerated to prevent the cool air from escaping, as seen in FIG. 2 with the truck's door (R+L) swung open. In preferred embodiments, the sealing element 60 can be a thick foam bulkhead adapted to be received in the opening. The bulkhead can be secured into place with tape or jackscrews. Additionally, the bulkhead can be fitted with a plastic or rubber sealing strip 62 along its edges to further insulate the area to be cooled. In other embodiments, a plastic or rubber sheet can be used and may be sealed to the opening with duct tape or other temporary sealing means. In other embodiments the sealing element 60 can be constructed of plastic, rubber, wood, metal, or any other suitable material, and can be adapted as necessary to fit into the opening of the space to be refrigerated. The sealing element 60 can have two or more ports 64, 66 adapted to receive the air supply/return hoses therein. The ports 64, 66 should penetrate through the thickness of the sealing element 60 such that air can freely flow between the cooling unit 30, supply/return hoses 50, 52, and the space needing refrigeration. Typically, the sealing element 60 is adapted to be received by the bay doors of a refrigerated truck or trailer; however, it is contemplated that the sealing element can be received in a side door of the truck/trailer, or other location as required. In an alternate example embodiment, the sealing element 60 can be adjustable, so that a user can manipulate the element to fit into openings of various sizes. The sealing element can be adapted to take advantage of the "E-track" found in most tractor-trailer trailers. In another embodiment, the sealing element can take the form of an expandable panel, sort of accordion-style, to fill the door opening.

Figure 3:
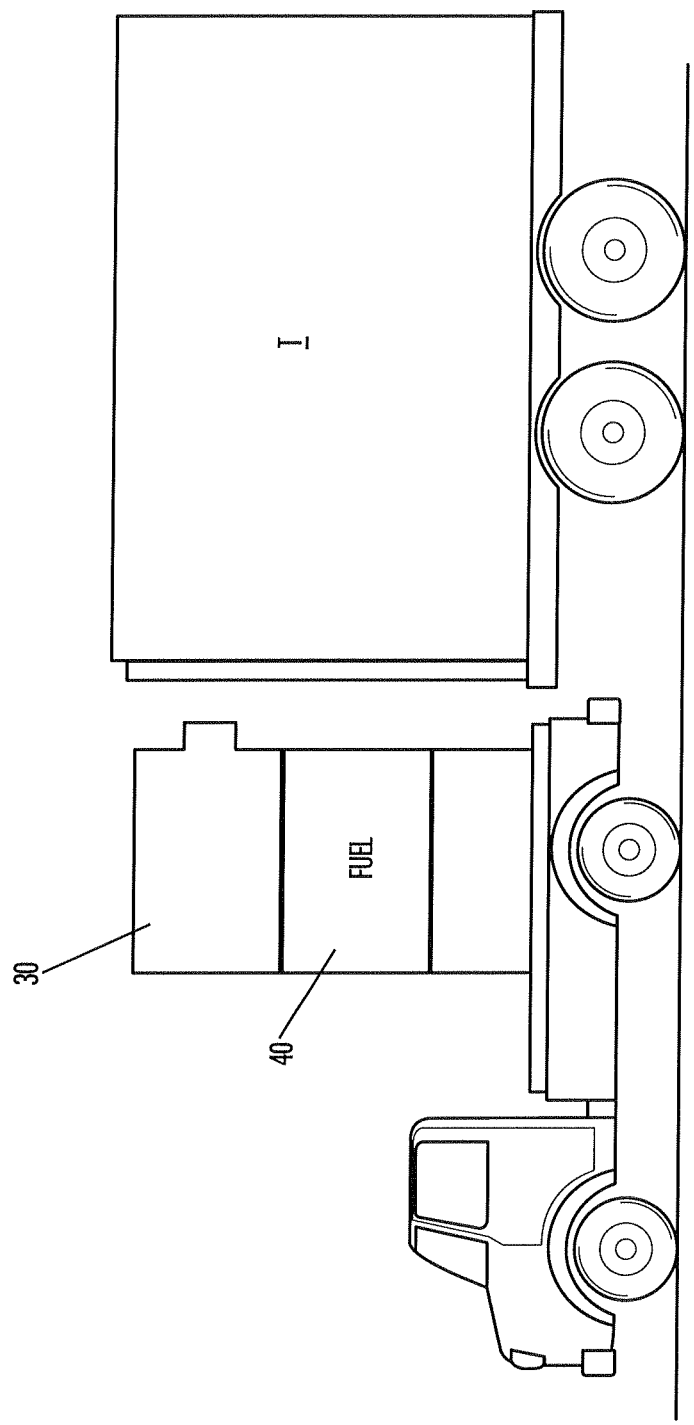
FIGS. 3-6 show portable auxiliary refrigeration units according to alternative example embodiments of the present invention.
Figure 4:
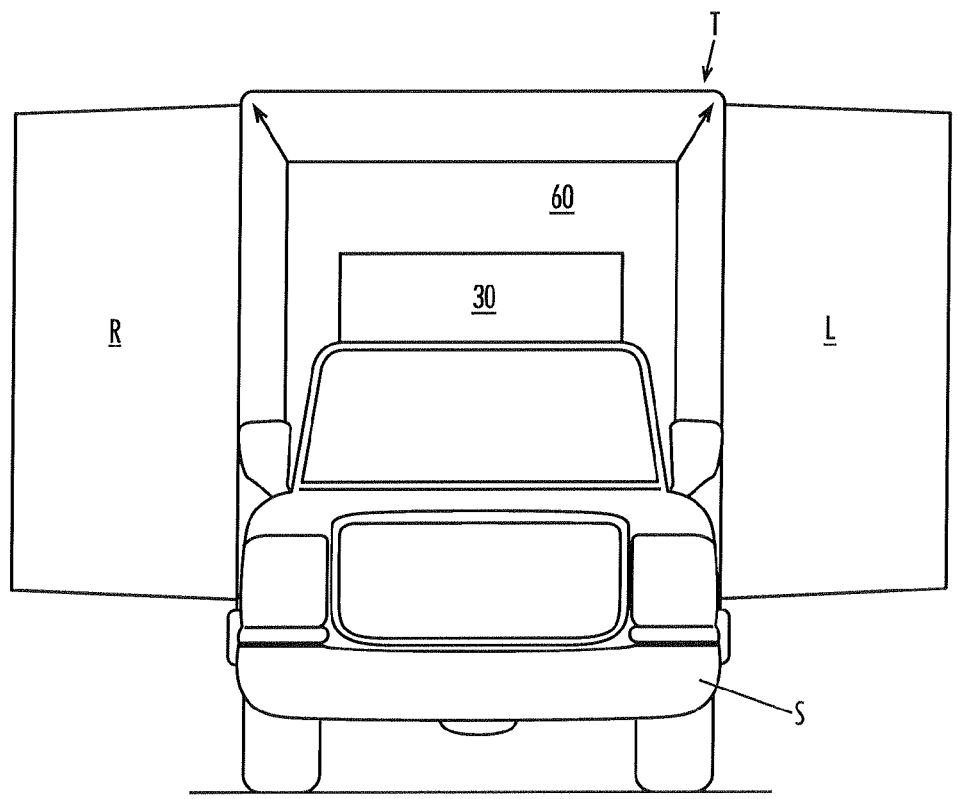

FIGS. 3 and 4 shows an auxiliary cooling unit 30 backed up to the rear double door opening of a tractor trailer trailer T. In the embodiment shown here, the auxiliary cooling unit 30 is mounted to a service truck S for transport directly to the truck or trailer needing auxiliary cooling. The rear doors, R and L are shown swung open to provide access to the interior of the truck T. A sealing element 60 is provided and is shown in the figure as a flexible skirt, depicted in the figure as being stretched toward a configuration in which the corners of the skirt reach the corners of the door opening.

Figure 5:
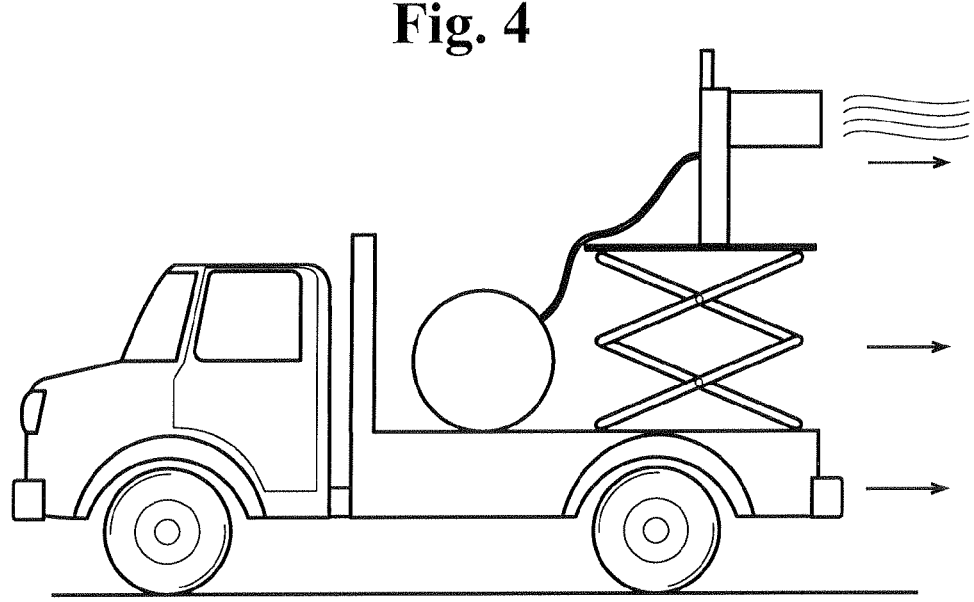
Figure 6:
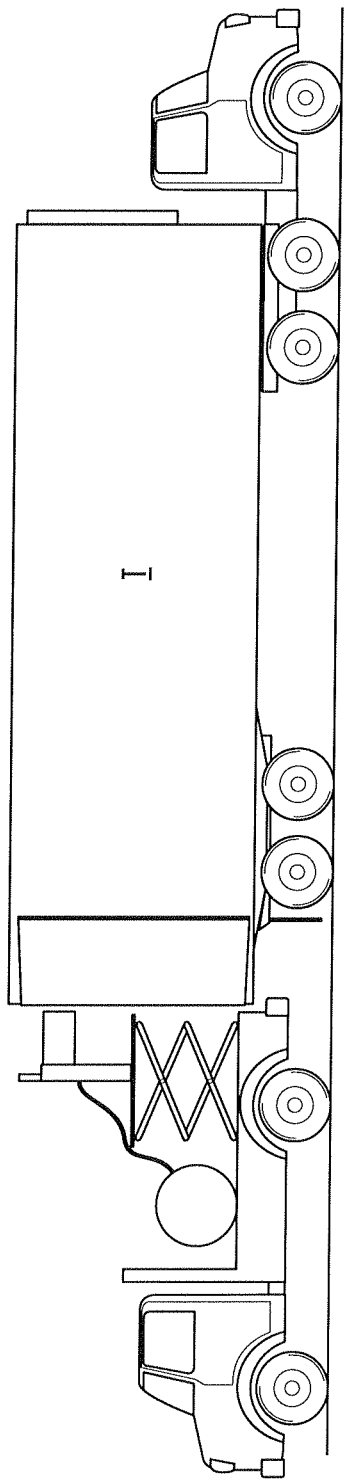

FIGS. 5 and 6 show an alternative embodiment with a movable platform for raising and lowering the auxiliary cooling unit to an appropriate level for the particular truck or trailer needing auxiliary climate controlled air. As shown in this figure, one needn't raise the entire trailer or truck bearing the auxiliary cooling unit, instead only the auxiliary cooling unit can be raised. Alternatively, the use of flexible hoses (ducts) can accomplish a similar goal of accommodating trucks and trailers of various heights. To this end the sealing element could be raised or lowered (along with some flexible hose) to cover a door opening at various levels.

Current truck and trailer climate control technologies utilize a refrigeration unit that is built into the trailer or truck and blows cold air out at the top of the trailer and sucks the (relatively) hot air from the bottom part of the same unit. Optionally, the present invention can be provided with a directional vent on the bulkhead to direct the cold air to the top or the bottom as desired. Also, the invention can include a length of ducting to carry the conditioned air far from into the trailer or truck. For example, if a trailer is containing perishable items from one thereof to the other, it can be advantageous to carry at least some of the conditioned air at least part way toward the opposite end, such as by the use of flexible ducting. Also, the ducting could be directed in various orientations, as desired.

Figure 7:
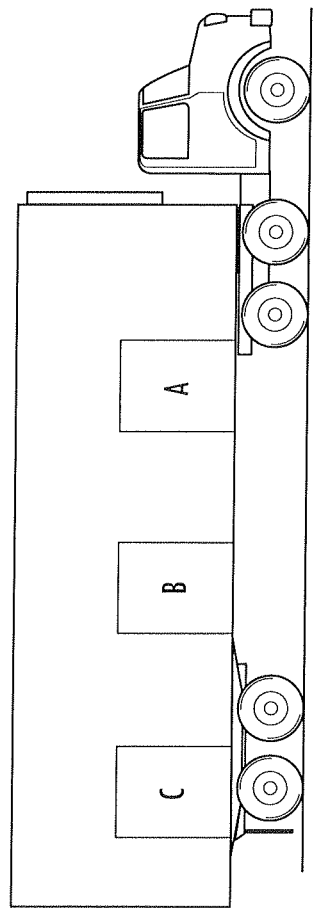
FIG. 7 shows a conventional foodservice trailer, with multiple compartments and multiple compartment access doors, such as might be serviced by the present invention.

FIG. 7 shows a typical food service trailer, with a frozen (sub-zero) compartment up front accessed by a door labeled "A", a chilled compartment in the middle accessed by a door labeled "B", and a non-refrigerated compartment at the rear accessed by a door labeled "C". In this way, one trailer can be used to provide a business with frozen, chilled and non-perishable items. The present invention can be utilized to maintain the desired conditions in the chilled or frozen compartments. Typically, the chilled and frozen compartments have separate cooling units, such that it would be unlikely that both would be out of service at the same time. As such, the present invention typically would be servicing one or the other of the frozen and chilled compartments in such food service trailers. However, under unusual circumstances both units could be out, in which case a pair of units of the present invention could be employed, one for each compartment. Alternatively, a single auxiliary unit could service both compartments through the use of thermostats and separate chilled air ducts and appropriate air handling components (to control the flow of chilled air to each compartment).

In operation, a user can first park the truck/trailer housing the refrigeration unit 10 near the rear of a broken down refrigerated truck/trailer T or other similar location needing temporary refrigeration. In the case of a trailer being left at the location needing cooling, the trailer can be fitted with an anti-theft device such as a wheel-locker, hitch lock, or other locking device. A user can then fit the sealing element 60 over the opening to the space needing cooling, and the user can connect the air supply/return hoses 50, 52 to the ports 64, 66 in the sealing element 60. Finally, the user would engage the cooling unit 30 and the unit would begin recycling, circulating and refrigerating the air inside the broken down truck/trailer T. The refrigeration unit 10 can comprise a thermostat to regulate the temperature of the air inside the area to be cooled. When the area to be cooled no longer needs temporary refrigeration, the portable refrigeration unit 10 can be decoupled from the same.

It will understood by those skilled in the art that the present invention has ready application to maintaining the climate controlled conditions within a truck or trailer, be that in the form of keeping things cool or keeping things warm. Indeed, the typical refrigerated truck or trailer is capable of keeping cargo warm in the wintertime. The present invention can be used also to keep cargo warm in spite of frigid ambient conditions.

While the invention has been described with reference to example embodiments, it will be understood by those skilled in the art that a variety of modifications, additions and deletions are within the scope of the invention.

I claim:

1. A method of temporarily maintaining the climate control conditions of perishable items contained in a climate-controlled first truck or trailer whose climate control unit is not functioning properly, the method comprising the steps of:

providing a rescue trailer mounted on a drivable second truck that has a driver cabin, the trailer of the drivable second truck includes an auxiliary climate control unit;

transporting the rescue trailer having the auxiliary climate control unit to the climate-controlled truck or trailer at a remote location by driving the drivable second truck to the climate-controlled first truck or trailer, the auxiliary climate control unit having a sealing element and a first air duct for delivering conditioned chilled air to the interior of the climate-controlled truck or trailer, the auxiliary climate control unit having a second air duct to return air inside the climate-controlled truck or trailer to the auxiliary climate control unit to recycle the air, the sealing element having a first aperture for mating with the first air duct and a second aperture for mating with the second air duct, the sealing element is adapted to seal a rear, double-door opening of the first truck or trailer, the sealing element comprises a foam panel adapted to fill the double-door opening and a peripheral gasket for sealing the edges of the foam panel against edges of the double-door opening;

opening one or more doors of the climate-controlled first truck or trailer to provide access through the double-door opening to the perishable items inside the climate-controlled first truck or trailer;

positioning the rescue trailer having the auxiliary climate control unit adjacent the climate-controlled first truck or trailer such that the auxiliary climate control unit is generally near one of more doors of the climate-controlled truck or trailer;

placing the sealing element in or adjacent the door opening of the climate controlled first truck or trailer to provide a seal thereat, the sealing element being positioned in such a manner so that the two apertures occupy an area corresponding to a first door of the double-door opening, the sealing element having a planar area that does not have any apertures and which occupies an area corresponding to a second door of the double-door opening; and operating the auxiliary climate control unit temporarily to deliver chilled air through the first air duct and into the interior of the climate-controlled first truck or trailer temporarily while the climate control unit of the truck or trailer is not functioning properly, thereby maintaining the perishable items contained within the first truck or trailer temporarily despite the nonfunctioning of the climate control unit of the first truck or trailer and preventing the perishable items from being further damaged by the non-functioning of the climate control unit.

2. The method of claim 1, further comprising providing a sealing element made from at least one of plastic, rubber, wood, and metal.

3. The method of claim 2, further comprising providing the peripheral gasket made from at least one of plastic and rubber.

* * * * *